United States Patent
Sundaram et al.

(10) Patent No.: US 10,449,479 B2
(45) Date of Patent: Oct. 22, 2019

(54) INCREASING SCALES, CAPACITIES, AND/OR EFFICIENCIES IN SWING ADSORPTION PROCESSES WITH HYDROCARBON GAS FEEDS

(71) Applicant: ExxonMobil Research and Engineering Company, Annandale, NJ (US)

(72) Inventors: Narasimhan Sundaram, Annandale, NJ (US); Hans Thomann, Bedminster, NJ (US); David C. Calabro, Bridgewater, NJ (US); Frank Mittricker, Jamul, CA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 180 days.

(21) Appl. No.: 15/653,822

(22) Filed: Jul. 19, 2017

(65) Prior Publication Data

US 2018/0036672 A1    Feb. 8, 2018

Related U.S. Application Data

(60) Provisional application No. 62/370,881, filed on Aug. 4, 2016.

(51) Int. Cl.
*B01D 53/04* (2006.01)
*B01D 53/047* (2006.01)

(52) U.S. Cl.
CPC ..... *B01D 53/0423* (2013.01); *B01D 53/0446* (2013.01); *B01D 53/0473* (2013.01);
(Continued)

(58) Field of Classification Search
CPC ............ B01D 53/04; B01D 53/0423; B01D 53/0446; B01D 53/047; B01D 53/0473;
(Continued)

(56) References Cited

U.S. PATENT DOCUMENTS 2,440,326 A * 4/1948 Cadman ................ B01D 53/26
303/1
2,727,585 A 12/1955 Zankey
(Continued)

FOREIGN PATENT DOCUMENTS

CN    101475430 A    7/2009
DE    10296903 B4    10/2007
(Continued)

OTHER PUBLICATIONS

Kresge et al., "The Discovery of ExxonMobil's M41S Family of Mesoporous Molecular Sieves", Studies in Surface Science and Catalysis, 2004, vol. 148, pp. 53-72.
(Continued)

*Primary Examiner* — Frank M Lawrence, Jr.
(74) *Attorney, Agent, or Firm* — Priya G. Prasad; Andrew T. Ward (57) ABSTRACT

An adsorption module and associated processes for conducting advanced separations processes such as sorption enhanced water-gas shift (SEWGS). The adsorption module contains at least one angled baffle to create at least two tapered adsorbent beds within the adsorption module. The taper is such that the adsorbent beds' cross-sections within the adsorption module decrease in the direction of feed flow, thereby taking advantage of increased product purity and process efficiency provided by tapered adsorption beds.

36 Claims, 3 Drawing Sheets

(52) U.S. Cl.
CPC ...... *B01D 53/047* (2013.01); *B01D 2251/302* (2013.01); *B01D 2251/304* (2013.01); *B01D 2251/306* (2013.01); *B01D 2251/402* (2013.01); *B01D 2251/404* (2013.01); *B01D 2253/104* (2013.01); *B01D 2253/108* (2013.01); *B01D 2253/116* (2013.01); *B01D 2253/1124* (2013.01); *B01D 2256/10* (2013.01); *B01D 2256/16* (2013.01); *B01D 2256/22* (2013.01); *B01D 2257/102* (2013.01); *B01D 2257/504* (2013.01); *B01D 2259/40005* (2013.01); *B01D 2259/414* (2013.01); *Y02C 10/08* (2013.01)

(58) Field of Classification Search
CPC ........ B01D 2251/302; B01D 2251/304; B01D 2251/306; B01D 2251/402; B01D 2251/404; B01D 2253/104; B01D 2253/108; B01D 2253/1124; B01D 2253/116; B01D 2256/10; B01D 2256/16; B01D 2256/22; B01D 2257/102; B01D 2257/504; B01D 2259/40005; B01D 2259/414; Y02C 10/08
USPC ...... 96/121, 139, 152, 124; 95/96, 139, 130; 423/230
See application file for complete search history.

(56) References Cited

U.S. PATENT DOCUMENTS

| | | |
|---|---|---|
| 2,771,964 A | 11/1956 | Miller |
| 2,877,861 A | 3/1959 | Miller |
| 2,989,383 A | 6/1961 | Miller |
| 3,594,983 A | 7/1971 | Yearout |
| 3,722,189 A * | 3/1973 | Tourtellotte ........... B01D 53/62 55/DIG. 30 |
| 4,094,652 A | 6/1978 | Lowther |
| 4,269,611 A | 5/1981 | Anderberg |
| 4,312,641 A | 1/1982 | Verrando et al. |
| 4,329,158 A | 5/1982 | Sircar |
| 4,350,501 A | 9/1982 | Bannon |
| 4,424,837 A | 1/1984 | Farrell |
| 4,433,707 A | 2/1984 | Farnham |
| 4,698,072 A * | 10/1987 | Rohde ................. B01D 53/0423 95/119 |
| 4,702,903 A | 10/1987 | Keefer |
| 4,705,627 A | 11/1987 | Miwa et al. |
| 4,729,982 A | 3/1988 | Thistlethwaite et al. |
| 4,753,919 A | 6/1988 | Whittenberger |
| 4,772,579 A | 9/1988 | Thistlethwaite et al. |
| 4,801,308 A | 1/1989 | Keefer |
| 4,863,497 A | 9/1989 | Grenier et al. |
| 4,914,218 A | 4/1990 | Kumar et al. |
| 4,968,329 A | 11/1990 | Keefer |
| 5,057,296 A | 10/1991 | Beck |
| 5,074,892 A | 12/1991 | Leavitt |
| 5,082,473 A | 1/1992 | Keefer |
| 5,098,684 A | 3/1992 | Kresge et al. |
| 5,102,643 A | 4/1992 | Kresge et al. |
| 5,108,725 A | 4/1992 | Beck et al. |
| 5,171,333 A | 12/1992 | Maurer |
| 5,388,643 A * | 2/1995 | Yee ...................... E21B 43/006 166/266 |
| 5,827,358 A | 10/1998 | Kulish et al. |
| 5,958,368 A | 9/1999 | Ryoo et al. |
| 6,051,050 A | 4/2000 | Keefer et al. |
| 6,063,161 A | 5/2000 | Keefer et al. |
| 6,077,457 A | 6/2000 | Friesen et al. |
| 6,080,226 A | 6/2000 | Dolan et al. |
| 6,136,222 A | 10/2000 | Friesen et al. |
| 6,197,092 B1 | 3/2001 | Butwell et al. |
| 6,293,998 B1 | 9/2001 | Dolan et al. |
| 6,315,817 B1 | 11/2001 | Butwell et al. |
| 6,406,523 B1 | 6/2002 | Connor et al. |
| 6,471,749 B1 | 10/2002 | Kawai et al. |
| 6,475,265 B1 | 11/2002 | Baksh et al. |
| 6,514,318 B2 | 2/2003 | Keefer |
| 6,607,584 B2 | 8/2003 | Moreau et al. |
| 6,629,525 B2 | 10/2003 | Hill et al. |
| 6,651,658 B1 | 11/2003 | Hill et al. |
| 6,652,627 B1 | 11/2003 | Tonkovich et al. |
| 6,691,702 B2 | 2/2004 | Appel et al. |
| 6,802,970 B2 | 10/2004 | Rochette |
| 7,049,259 B1 | 5/2006 | Deckman et al. |
| 7,231,784 B2 | 6/2007 | Howard et al. |
| 7,270,792 B2 | 9/2007 | Deckman et al. |
| 7,491,250 B2 | 2/2009 | Hershkowitz et al. |
| 7,507,274 B2 | 3/2009 | Tonkovich et al. |
| 7,524,358 B2 | 4/2009 | Saxena et al. |
| 7,527,670 B2 | 5/2009 | Ackley et al. |
| 7,799,730 B2 | 9/2010 | Ringer et al. |
| 7,803,215 B2 | 9/2010 | Russell et al. |
| 7,938,886 B2 | 5/2011 | Hershkowitz et al. |
| 7,959,720 B2 | 6/2011 | Deckman et al. |
| 8,808,426 B2 | 8/2014 | Sundaram |
| 2003/0015093 A1 | 1/2003 | Wegeng et al. |
| 2003/0116016 A1 | 6/2003 | Monzyk et al. |
| 2005/0045030 A1 | 3/2005 | Tonkovich et al. |
| 2006/0075777 A1 | 4/2006 | Howard et al. |
| 2006/0102519 A1 | 5/2006 | Tonkovich et al. |
| 2006/0162556 A1 | 7/2006 | Ackley et al. |
| 2006/0165574 A1 | 7/2006 | Sayari |
| 2006/0210454 A1 | 9/2006 | Saxena et al. |
| 2006/0249020 A1 | 11/2006 | Tonkovich et al. |
| 2006/0254425 A1* | 11/2006 | Baksh ................. B01D 53/0407 96/132 |
| 2007/0085227 A1 | 4/2007 | Tonkovich et al. |
| 2007/0240449 A1 | 10/2007 | Howard et al. |
| 2007/0246106 A1 | 10/2007 | Tonkovich et al. |
| 2008/0000353 A1* | 1/2008 | Rang ................. B01D 53/0446 95/100 |
| 2008/0028286 A1 | 1/2008 | Chick |
| 2008/0105122 A1* | 5/2008 | Leitgeb ................. B01D 53/02 95/116 |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance et al. |
| 2008/0282892 A1 | 11/2008 | Deckman et al. |
| 2008/0314245 A1 | 12/2008 | Hershkowitz et al. |
| 2009/0151562 A1 | 6/2009 | Russell et al. |
| 2009/0211441 A1 | 8/2009 | Reyes et al. |
| 2009/0217691 A1 | 9/2009 | Schmidt et al. |
| 2009/0294348 A1 | 12/2009 | Krogue et al. |
| 2009/0308248 A1 | 12/2009 | Siskin et al. |
| 2009/0326279 A1 | 12/2009 | Tonkovich et al. |
| 2010/0251187 A1 | 10/2010 | Jain |
| 2010/0263534 A1 | 10/2010 | Chuang |
| 2010/0326272 A1 | 12/2010 | Asaro et al. |
| 2011/0165477 A1 | 7/2011 | Yamamoto |
| 2013/0333391 A1* | 12/2013 | Sundaram ................. F02C 3/34 60/783 |
| 2017/0136400 A1 | 5/2017 | Narasimhan et al. |

FOREIGN PATENT DOCUMENTS

| | | |
|---|---|---|
| EP | 148796 A2 | 7/1985 |
| EP | 1421986 B1 | 5/2004 |
| EP | 1080771 B1 | 10/2007 |
| JP | 2002326810 A | 11/2002 |
| JP | 2008117652 A | 5/2008 |
| WO | 9205859 A1 | 4/1992 |
| WO | 9614917 A1 | 5/1996 |
| WO | 20020087730 A2 | 11/2002 |
| WO | 20050061100 A1 | 7/2005 |
| WO | 20080000380 A1 | 1/2008 |
| WO | 20080143826 A1 | 11/2008 |
| WO | 20080143966 A1 | 11/2008 |
| WO | 20090105251 A1 | 8/2009 |

(56) References Cited

FOREIGN PATENT DOCUMENTS

| WO | 2010064121 A8 | 6/2010 |
|---|---|---|
| WO | 20100096916 A1 | 9/2010 |
| WO | 2010130787 A1 | 11/2010 |

OTHER PUBLICATIONS

Rezaei et al., "Structured adsorbents in gas separation proceses", Separation and Purification Technology, 2012, vol. 70., No. 3, pp. 243-256.
Ritter et al., "Tapered Pressure Swing Adsorption Columns for Simultaneous Air Purification and Solvent Vapor Recovery", 1998, vol. 37, Iss. 7, pp. 2783-2791.
Ruthven et al., "Performance of a parallel passage adsorbent contactor", Separation and Purification Technology, vol. 12 (1997) pp. 43-60.
Santos et al., "New cycle configuration to enhance performance of kinetic PSA processes", Chemical Engineering Science 66 (2011) pp. 1590-1599.
Suib et al., "Synthesis of Octahedral Moleccular Sieves and Layered Materials", Marcel Dekker, Inc., vol. 69 (1997) pp. 215-231.
Zamani et al., "Mesoporous Silica: A Suitable Adsorbent for Amines", Nanoscale Res Lett, vol. 4 (2009), pp. 1303-1308.
Zhao et al., "Triblock Copolymer Syntheses of Mesoporous Silica with Periodic 50 to 300 Angstrom Pores", Science, vol. 279 (Jan. 23, 1998), pp. 548-552.
The International Search Report and Written Opinion of PCT/US2012/026745 dated Sep. 17, 2012.
The International Search Report and Written Opinion of PCT/US2017/042760 dated Jan. 12, 2018.
The International Search Report of PCT/US2012/026753 dated Aug. 8, 2012.

* cited by examiner

INCREASING SCALES, CAPACITIES, AND/OR EFFICIENCIES IN SWING ADSORPTION PROCESSES WITH HYDROCARBON GAS FEEDS

CROSS REFERENCE TO RELATED APPLICATIONS

This application claims the benefit of U.S. Provisional Application No. 62/370,881, filed on Aug. 4, 2016, the entire contents of which are incorporated herein by reference.

This application is also related to U.S. Pat. No. 8,808,426 entitled INCREASING SCALES, CAPACITIES, AND/OR EFFICIENCIES IN SWING ADSORPTION PROCESSES WITH HYDROCARBON GAS FEEDS filed on Sep. 4, 2012, the entire contents of which also incorporated herein by reference.

FIELD

This invention relates to improvements in swing adsorption processes using a solid adsorbent material and more particularly to improvements in rapid cycle pressure and/or temperature swing adsorption processes to use the solid adsorbent material in a smaller amount and/or more efficiently.

BACKGROUND

Natural gas from many gas fields, which is often produced at high pressures, possibly as high as 50 MPa, can contain significant levels of $H_2O$, $H_2S$, $CO_2$, $N_2$, mercaptans, and/or heavy hydrocarbons that have to be removed to various degrees before the gas can be transported to market. It is preferred that as much of the acid gases, $H_2S$, and $CO_2$ be removed from natural gas as possible to leave methane as the recovered component. Small increases in recovery of this light component can result in significant improvements in process economics and also serve to prevent unwanted resource loss. It is desirable to recover more than 80 vol %, preferably more than 90 vol %, of the methane when detrimental impurities are removed. In many instances effective removal of the $H_2S$ is more important than $CO_2$ removal as specifications for natural gas transmission pipelines typically limit the $H_2S$ content to be as low as 4 vppm while a more relaxed specification of two to three percent is typically permissible for $CO_2$. If the contaminant removal process is unselective between these two gases or favorable to $CO_2$ removal, the treatment will be unnecessarily severe, resulting in increased processing costs. A natural gas treatment process which is selective for $H_2S$ relative to $CO_2$ is therefore economically attractive.

Methane may also be recovered from methane hydrate formations. A large volume of methane is currently contained in permafrost regions in the form of methane hydrates. In many cases, it may be desirable to recover the methane from the methane hydrates. Methane gas can be recovered from a methane hydrate formation by adding a gas mixture containing nitrogen and carbon dioxide gases to the methane hydrates. Specifically, the methane within the methane hydrates is reacted with the gas mixture, and the gas mixture replaces the methane within the methane hydrates, thus releasing the methane. The gas mixture will typically contain $CO_2$ and $N_2$. The $CO_2$ and $N_2$ may be produced from treatment of refinery flue gas through a swing adsorption process such as those described in U.S. Provisional Application No. 62/256,383, which is incorporated herein by reference. The $CO_2$ within the gas mixture replaces the methane within the methane hydrates. In addition, the $N_2$ within the gas mixture aids in the release of the methane from the methane hydrates by increasing the temperature of the methane hydrates. In such applications, however, the $CO_2$ and $N_2$ must be injected into the hydrate formation at higher pressures, such as at least 25 bar, or at least 30 bar.

Additionally, Carbon Capture and Sequestration (CCS) is at the forefront of the energy industry. CCS generally encompasses the field of capturing waste carbon dioxide from large point sources, such as refineries or coal fired power plants, transporting it to a storage site and depositing it where it will not enter the atmosphere, such as an underground geological formation.

Synthesis gas or "syngas" is a byproduct a variety of refinery processes. Syngas is a mixture comprising carbon monoxide, carbon dioxide, and hydrogen. It is produced by gasification (or burning/combustion) of a carbon containing fuel to a gaseous product. Production of syngas is ubiquitous to refinery processing via the inevitable use of furnaces, boilers, reformers and the like found in hydrocarbon processing. Even in emerging technologies, such as fuel cells, syngas is produced as a byproduct along with electricity, water, and heat.

The Water Gas Shift (WGS) reaction is an important player in CCS and the proper handling of syngas. WGS describes the reaction of carbon monoxide and water vapor to form carbon dioxide and hydrogen.

$$CO + H_2O \rightleftharpoons CO_2 + H_2$$

As can be see, the WGS reaction provides a source of hydrogen at the expense of carbon monoxide. Hydrogen is a valuable product and can be used in hydroprocessing applications, which generally refers to conversion of heavy petroleum fractions into lighter ones via hydrocracking. It can also be used to produce ammonia. Hydrogen used in hydroprocessing applications must be extremely pure to be effective for its intended purpose, e.g. 99.9% pure, or 99.99% pure.

Hydrogen is most abundantly produced by steam methane reformers (SMR) in petrochemical facilities. Steam reforming describes the reaction of methane with steam to produce hydrogen and carbon monoxide.

$$CH_4 + H_2O \rightarrow CO + 3H_2$$

Here, methane is exposed to steam at very high temperatures to form carbon monoxide and hydrogen. In a second stage, additional hydrogen is produced by exposing the carbon monoxide product to the WGS reaction described above.

Sorption Enhanced Water Gas Shift (SEWGS) describes processes where the WGS reaction is combined with $CO_2$ capture. Syngas enters the SEWGS unit where carbon monoxide is treated with steam to produce carbon dioxide and hydrogen. The carbon dioxide is then adsorbed onto an adsorbent producing a nearly pure hydrogen product. Carbon dioxide can then be desorbed and then deposited via the sites CCS facilities.

Conventional SEWGS methods for capturing carbon dioxide tend to reduce the efficiency of the CCS process, due to the additional steam energy required to capture and/or sequester the carbon dioxide. Specifically, conventional processes utilize a costly, energy intensive steam rinse, which creates a large energy penalty on the plant. There is a need for an adsorption module and process that can produce pure hydrogen in an economical way.

Natural gas or syngas treating is often carried out using solid sorbents such as activated charcoal, silica gel, activated alumina, or various zeolites. The well-established pressure swing adsorption (PSA) process has been used in this way since about the 1960s. In the PSA process, the solid sorbent is contained in a vessel and adsorbs a gas species at high pressure and when the design sorption capacity of the sorbent is attained the gas stream is switched to another sorption vessel while the pressure in the first vessel is reduced to desorb the adsorbent component. A stripping step with inert (non-reactive) as or with treated product gas may then follow before the vessel is returned to the sorption portion of the cycle. Variants of the conventional PSA (cPSA) process have been developed including the partial pressure swing or displacement purge adsorption (PPSA), rapid cycle pressure swing adsorption (RCPSA), Dual Bed (or Duplex) PSA Process, and rapid cycle partial pressure swing or displacement purge adsorption (RCPPSA) technologies.

Temperature swing adsorption (TSA) provides an alternative to the pressure swing technology in which the sorbed component is desorbed by an increase in temperature typically achieved by the admission of high temperature gas, e.g., air, to the vessel in the regeneration phase. Rapid cycle thermal swing adsorption (RCTSA) is a variant of the conventional TSA process using short cycles, typically less than two minutes. TSA processes are generally available commercially from a number of technology suppliers, although the state of the art for large scale rapid cycle TSA units is considerably less advanced. Large scale slow (~10 hr.) cycle internally heated TSA's have been used in natural gas processing for rigorous dehydration and mercaptan removal. In an internally heated thermal swing adsorption process, the gas or fluid used to heat the contactor directly contacts the adsorbent material. As such, the gas or fluid used to heat the contactor during regeneration can pass through the same channels that the feed gas does during the adsorption step. Externally heated thermal swing adsorption processes employ contactors having a separate set of channels to carry gases or fluids used to heat and cool the contactor so that gases used to heat and cool the contactor do not mix with the adsorbent that contacts the feed gas.

Indeed, adsorptive separation may be achieved, as noted by Yang by three mechanisms, steric, equilibrium, or kinetic: R. T. Yang, *Gas Separation by Adsorption Processes*, Imperial College Press, 1997, ISBN: 1860940471, ISBN-13: 9781860940477. A large majority of processes operate through the equilibrium adsorption of the gas mixture and kinetic separations have attracted considerable attention with the development of functional microporous adsorbents and efficient modeling tools. Relatively few steric separation processes have been commercialized. Kinetically based separation involves differences in the diffusion rates of different components of the gas mixture and allows different species to be separated regardless of similar equilibrium adsorption parameters. Kinetic separations utilize molecular sieves as the adsorbent since they exhibit a distribution of pore sizes which allow the different gaseous species to diffuse into the adsorbent at different rates while avoiding exclusion of any component of the mixture. Kinetic separations can be used for the separation of industrial gases, for example, for the separation of nitrogen from air and argon from other gases. In the case of the nitrogen/oxygen separation (for example, oxygen and nitrogen differ in size by only 0.02 nm), the separation is efficient since the rate of transport of oxygen into the carbon sieve pore structure is markedly higher than that of nitrogen. Hence, the kinetic separation works, even though the equilibrium loading levels of oxygen and nitrogen are virtually identical.

It has been reported that tapered adsorbent beds can improve product purity in PSA cycling applications. See James A. Ritter et al., *Tapered Pressure Swing Adsorption Columns for Simultaneous Air Purification and Solvent Vapor Recovery*, 37 IND. ENG. CHEM. RES. 2783-91 (1998). Ritter reports, among other things, that in an adiabatic bed in PSA cycling, product purity is several orders of magnitude higher in a tapered bed compared to a non-tapered bed. Ritter, at 2787, FIG. 5. This improvement in purity is of particular significance to hydrogen production where very high purities, e.g. 99.9% purity or greater are required. Moreover, Ritter describes another advantage of tapered versus conventional adsorbent beds with respect to temperature profile across the bed. Ritter, at 2787, FIG. 6. For tapered beds, the temperature profile at the end of the feed or adsorption step is substantially lower in the mass transfer zone. This lower temperature maintains a higher $CO_2$ adsorption as well as a higher water gas shift conversion in the case of a syngas feedstream. Tapered adsorbent beds, however, are irregularly shaped and cannot be easily incorporated into a tight refinery environment, where space is at a premium.

It would therefore be advantageous to be able to incorporate the efficiencies gained via utilization of a tapered bed within a more conventionally shaped vessel.

SUMMARY

In various aspects adsorption modules and associated methods for advanced gas separations are provided. In one aspect, the adsorption module comprises a vessel containing an adsorbent; a baffle within the vessel, the baffle angled to create two separated, tapered adsorbent beds within the vessel; the adsorbent beds each comprising a feed end cross-sectional area and a product end cross-sectional area, wherein the feed end cross-sectional area is greater than the product end cross-sectional area. The vessel may be tubular or prismatic. The baffle can be textured to improve flow characteristics or not. In certain aspects, the baffle is angled between 10 and 60° from the vertical plane, inclusive. In yet another aspect, the ratio of the feed end cross-sectional area to the product end cross-sectional area is from 1.2 to 10, inclusive. Inlet and outlet to adsorption module may be controlled via non-rotary valves or rotary valves.

In certain aspects, the adsorbent may comprise one of an (i) alkali metal carbonate and an oxide of an alkaline earth metal or a transition metal and (ii) alkaline earth metal carbonate and an oxide of a transition metal. In one aspect, the alkali metal carbonate is potassium carbonate, lithium carbonate, or sodium carbonate. The adsorbent may also comprise a transition metal oxide of a transition metal that forms an oxide with the metal in a +2 or +3 oxidation state. In another aspect, the adsorbent can include at least one of lithium carbonate and potassium carbonate and at least one of lanthanum oxide, yttrium oxide, and magnesium oxide. In yet another aspect, the alkaline earth metal carbonate is magnesium carbonate or calcium carbonate. In a further aspect, the adsorbent includes at least one of magnesium carbonate and calcium carbonate and at least one of lanthanum oxide, yttrium oxide, and magnesium oxide.

In another aspect, the adsorption module can include an additional baffle, the additional baffle angled and intersecting the first baffle to create four separated, tapered adsorbent beds within the vessel; the adsorbent beds each comprising a feed end cross-sectional area and a product end cross-sectional area, wherein the feed end cross-sectional area is greater than the product end cross-sectional area.

In other aspects, processes for gas separations are also provided. Such processes include providing a feedstream containing a first concentration of a first product gas and a first concentration of a second product gas; contacting the feedstream with an adsorption module comprising a vessel, the vessel including an angled baffle within the vessel to create two separated, tapered adsorbent beds within the vessel; the adsorption beds each comprising a feed end cross-sectional area and a product end cross-sectional area, wherein the feed end cross-sectional area is greater than the product end cross-sectional area; the adsorption beds comprising an adsorption material under conditions sufficient for the adsorption material to selectively adsorb the second product gas in comparison to the second product gas, so as to form a gas effluent having a second concentration of the first product gas that is higher than the first concentration in the feedstream and having a second concentration of the second product gas that to is lower than the first concentration in the feedstream; and selectively desorbing the second product gas from the adsorption material, so as to form a product effluent having a third concentration of the second product gas that is at least 20 wt % higher than the first concentration in the feedstream and having a second concentration of the first product gas that is at least 20 wt % lower than the first concentration in the feedstream. The adsorption process can be a pressure swing adsorption process or any other adsorption process. In certain aspects, the conditions sufficient include an adsorption temperature of at least 400° C., wherein the adsorbent material comprises an one of an (i) alkali metal carbonate and an oxide of an alkaline earth metal or a transition metal and (ii) alkaline earth metal carbonate and an oxide of a transition metal. In additional aspects, the pressure of the first and second product gases is the same as feedstream pressure.

In certain aspects, the first product gas purity is at least 99.99%. In one aspect the feedstream comprises syngas, the first product gas comprises hydrogen, and the second product gas comprises $CO_2$. In another aspect, the first product gas is nitrogen and the second product gas is $CO_2$. In other aspects, the adsorption module comprises a first adsorbent selective for nitrogen and a second adsorbent selective for $CO_2$. In yet another aspect, the first adsorbent is selected from the group consisting of 4A and NaA zeolites and the second adsorbent is selected from the group consisting of activated carbons, aluminas, metal organic framework, mixed metal oxides, hydrotalcites or combinations thereof.

In yet another aspect, the process can further include, when the first and second product gases are $CO_2$ and nitrogen, injecting the produced nitrogen and $CO_2$ into a methane hydrate reservoir for methane recovery. In one aspect, the nitrogen and $CO_2$ are injected into the methane hydrate reservoir at a pressure of at least 25 bar.

BRIEF DESCRIPTION OF THE DRAWINGS

FIG. 4b shows an isometric view of the module in FIG. 4a.

FIG. 5b shows an isometric view of the module in FIG. 5a.

DETAILED DESCRIPTION OF THE EMBODIMENTS

General Considerations

Though much discussion centers herein on separation/purification of $CO_2$ and hydrogen production from syngas feedstreams, it is contemplated herein that the processes, apparatuses, and systems disclosed herein can additionally or alternately be applicable in one or more of the following applications: separation/purification of $CO_2$ from refinery flue gas, removal of acid gas, nitrogen-containing impurities, sulfur-containing impurities, and/or other undesirable impurities from hydrocarbon-containing (e.g., natural) gas feedstreams, carbon dioxide capture/sequestration in standard, arctic, and/or off-shore gas and/or oil production, including shale gas production, shale oil production, and the like; air separation processes (e.g., separating oxygen from nitrogen), as alternative to cryogenic processes, for instance for use in oxyfuel refinery processes; and/or for large scale (e.g., 75-150 MSCFD or higher) hydrogen purification processes, typically for refinery hydrotreatment processes but optionally also for syngas and/or power generation applications.

In one embodiment, the feedstream can comprise a syngas, a first desired product gas can comprise $H_2$ and a second desired product gas can comprise $CO_2$. In another embodiment of the process according to the invention, the feedstream can comprise or be natural gas, the at least one desired product gas can comprise or be $CH_4$, and at least one contaminant gas can comprise or be $CO_2$, $H_2S$, $NO_x$, $SO_x$, or a combination thereof. In another embodiment of the process according to the invention, the feedstream can comprise a refinery flue gas, the at least one desired product gas can comprise $CO_2$, and the at least one contaminant gas can comprise $N_2$, $H_2S$, $NO_x$, $SO_x$, or a combination thereof. In another embodiment, the feedstream can comprise a refinery flue gas, a first desired product gas can comprise $CO_2$ and a second desired product gas can comprise $N_2$. In still another embodiment of the process according to the invention, the feedstream can comprise air, the at least one desired product gas can comprise $N_2$, and the at least one contaminant gas can comprise $O_2$. Alternately, the feedstream can comprise air, the at least one desired product gas can comprise $O_2$, and the at least one contaminant gas can comprise $N_2$. In yet another embodiment of the process according to the invention, the feedstream can comprise a hydrocarbon conversion product stream or a chemical plant product or waste stream, the at least one desired product gas can comprise an olefin (e.g., ethylene, propylene, 1-butene, 2-butene, isobutylene, or the like, or a combination thereof), and the at least one contaminant gas can comprise a saturated hydrocarbon (e.g., methane, ethane, propane, butane, cyclobutane, pentane, cyclopentane, or the like, or a combination thereof), a diolefin (e.g., 1,3-butadiene, 1,3-pentadiene, 1,4-pentadiene, or the like, or a combination thereof), and/or an optionally heteroatom-containing hydrocarbon material having a triple bond (e.g., acetylene, acrylonitrile, or the like, or a combination thereof). In another embodiment, the feedstream can comprise a syngas, a first desired product gas can comprise $H_2$ and a second desired product gas can comprise $CO_2$. In a yet still further embodiment of the process according to the invention, the separation process can be used to remove contaminants from feedstreams for (ultra)purification applications, e.g., where extremely high (for example at least 99.9 wt %, at least 99.99 wt %, or higher) desired product gas purity and/or extremely low (for example not more than 1000 wppm, not more than 500 wppm, not more than 100 wppm, or lower) contaminant gas concentration is required, such as for semiconductor manufacture and/or cleaning.

Adsorbent

The adsorbent material can be comprised of uncoated adsorbent particles, coated adsorbent particles, or a monolithic adsorbent, which may itself be made from an agglomeration or packing of such adsorbent particles. For coated adsorbent particles, it can be preferred to have an adsorbent layer of relatively uniform thickness on the adsorbent material (particles). The preferred thickness of the adsorbent layer can be set by the mass transfer coefficients, as well as the time of the key steps in the swing adsorption process (e.g., adsorption and desorption steps). Calculation of these mass transfer rate constants is well known to those having ordinary skill in the art and may additionally or alternatively be derived by those having ordinary skill in the art from standard testing data. D. M. Ruthven & C. Thaeron, "Performance of a Parallel Passage Absorbent Contactor," *Separation and Purification Technology*, 12 (1997), 43-60, which is incorporated herein by reference, discloses many aspects of how the mass transfer can be affected by the thickness of the adsorbent, channel gap, and cycle time of the process. Also, U.S. Pat. No. 6,607,584, which is also incorporated by reference herein, describes the details for calculating these transfer rates and associated coefficients for a given adsorbent and the test standard compositions used for conventional PSA.

Thickness can advantageously be taken to refer to the average thickness of the adsorbent. The thickness uniformity can be assessed from measurements of the thickness of the adsorbent and/or from the way in which it is fabricated. It can be preferred in many embodiments that the thickness uniformity of the adsorbent be such that the standard deviation of its thickness is less than about 40% of the average thickness, e.g., less than about 15% or less than about 5%.

In one embodiment, the coated adsorbent particles can be assembled into an ordered structure which to a degree can approach the functionality of a monolith without some or all of its attendant disadvantages. As noted above, conventional monolith adsorbents have their own characteristic advantages and disadvantages, one of which is that it is difficult to form a thin and reliably uniform wash coating of adsorbent on the support, especially if the monolith has pores of relatively small diameter when the coating solution may clog the pore entrances and preclude further ingress of coating material. In this case, the adsorption characteristics of the monolith are likely to be unpredictable and less than optimal. To overcome this drawback, while retaining advantages of the monolith to a certain extent, including its low tortuosity and predictable void volume, the present particulate adsorbents can preferably be formed into a simulated monolith by laying down a layer of the adsorbent material on the surfaces of the particles and then assembling the particles into the adsorbent bed, e.g., either by packing directly into the sorption vessel in a densely packed bed or, more preferably, by forming the coated structured adsorbent particles into shaped structures which can then be packed into the vessel in the form of blocks, similarly to blocks of monolith. In effect, the conventional method of monolith fabrication can be inverted and the adsorbent coated onto the outside of the support particles and the monolith-like structure then assembled from the coated particles. In this way, not only can a more uniform coating of the essential adsorbent be achieved but the pore structure of the simulated monolith can be controlled by using particles of different shapes and surface roughness. When operating in this manner, the adsorbent particles should have a ratio of length to maximum cross-sectional dimension ratio of at least 2:1, preferably at least 5:1, and a maximum cross-sectional dimension typically not more than 5 mm, for example not more than 1 mm. After the particles are laid down in the ordered configuration with longitudinally extensive, substantially aligned gas channels, the particles can then be bundled/adhered together in the mass to form a coherent, self-supporting body. The masses can then be placed in the vessel with the gas passages aligned in the desired orientation to form an ordered adsorbent bed.

If it is desired to have an ordered arrangement of the particles with longitudinal gas passages aligned with each other to permit access of the gases to the adsorbent coating substantially along the lengths of the particles and over the maximum area available for gaseous diffusion, the particles can preferably be formed with a relatively high aspect ratio of length to the maximum cross-sectional dimension, e.g., of at least 2:1, such as at least 3:1, at least 5:1, at least 10:1, or at least 20:1, with the maximum ratio potentially as high as the structural strength of the core material might permit without leading to excess breakage or attrition of the particles during loading, packing (as described below), or in use. Particles of this configuration can generally be described as cylinders or polygonal prisms with various cross-sections such as square, rectangular, pentagonal, hexagonal, octagonal, or as polylobar extrudates, (e.g., trilobe, quadlobe, or the like). Additionally or alternately, the particles may be hollow with a central gas passage which itself may be coated with the adsorbent along with the external surfaces of the particle. Longitudinal grooves may be provided in the shape so as to provide additional gas channels or passages along the exterior of the particles. Hollow particles and grooved particles should typically have a minimum wall thickness adequate to confer the desired crush strength to the particles.

The adsorbent material coated onto the core particles can be selected according to the service needs, particularly the composition of the incoming gas stream, the contaminants which are to be removed and the desired service conditions, e.g., incoming gas pressure and temperature, desired product composition and pressure. In certain embodiments disclosed herein, the feedstream can be introduced at higher pressures, for example at least 50 bar, at least 60 bar, at least 70 bar, or at least 80 bar. Non-limiting examples of selective adsorbent materials can include, but are not limited to, microporous materials such as zeolites, metal organic frameworks, AlPOs, SAPOs, ZIFs, (Zeolitic Imidazolate Framework based molecular sieves, such as ZIF-7, ZIF-8, ZIF-22, etc.), and carbons, as well as mesoporous materials such as amine-functionalized MCM materials, and combinations and intergrowths thereof. For the acidic gases, such as hydrogen sulfide and carbon dioxide, typically found in natural gas streams, adsorbent such as cationic zeolites, amine-functionalized mesoporous materials, stannosilicates, carbons, and combinations/intergrowths thereof can be suitable.

One example of a suitable adsorbent includes a mixed metal oxide adsorbent, such as an adsorbent including a mixture of an alkali metal carbonate and an alkaline earth metal oxide and/or a transition metal oxide. Examples of suitable alkali metal carbonates can include, but are not limited to, a carbonate of lithium, sodium, potassium, rubidium, cesium, or a combination thereof, e.g., a carbonate of lithium, sodium, potassium, or a combination thereof. Examples of suitable alkaline earth metal oxides can include, but are not limited to, oxides of magnesium, calcium, strontium, barium, or a combination thereof, e.g., oxides of magnesium and/or calcium. Some examples of suitable transition metal oxides can include, but are not limited to, oxides of lanthanide series metals, such as lanthanum, and/or of transition metals that can form oxides with the metal in a +2 or +3 oxidation state (such as yttrium, iron, zinc, nickel, vanadium, zirconium, cobalt, or a combination thereof).

In some aspects, the carbonate can be selected independently from the oxide in the mixed metal oxide. In such aspects, the carbonate can include, consist essentially of, or be lithium carbonate, sodium carbonate, potassium carbonate, rubidium carbonate, and/or cesium carbonate (e.g., lithium carbonate, sodium carbonate, and/or potassium carbonate; lithium carbonate and/or potassium carbonate; lithium carbonate and/or sodium carbonate; or sodium carbonate and/or potassium carbonate).

In aspects where the carbonate is selected independently from the oxide, the oxide can be an alkaline earth oxide, a transition metal oxide, a combination of two or more alkaline earth oxides, a combination of two or more transition metal oxides, or a combination of oxides including at least one alkaline earth oxide and at least one transition metal oxide. In aspects where the independently selected oxide includes one or more alkaline earth oxides, a suitable alkaline earth oxide can include, consist essentially of, or be magnesium oxide, calcium oxide, strontium oxide, and/or barium oxide, e.g., including at least magnesium oxide and/or calcium oxide. Additionally or alternatively, it may be advantageous to incorporate graphene complexes into the metal oxides to assist in adsorption.

In aspects where the independently selected oxide includes one or more transition metal oxides, suitable transition metals can include, consist essentially of, or be one or more transition metals that can form oxides with the metal in a +2 or +3 oxidation state (e.g., yttrium oxide, iron oxide, zinc oxide, nickel oxide, vanadium oxide, cobalt oxide, zirconium oxide, lanthanum oxide, other oxides of lanthanide metals, and/or a combination thereof). One preferred option includes a transition metal oxide selected from lanthanum oxide and/or zirconium oxide. Another option includes a metal oxide selected from lanthanum oxide, yttrium oxide, zirconium oxide, and/or zinc oxide. Yet another option includes a metal oxide selected from nickel oxide, cobalt oxide, and/or iron oxide. Mixtures within each of these options and/or across options are also contemplated, such as mixtures of lanthanum oxide with zinc oxide and/or vanadium oxide; mixtures of lanthanum oxide with iron oxide, cobalt oxide, and/or nickel oxide; mixtures of zirconium oxide with yttrium oxide, zinc oxide, and/or vanadium oxide; and mixtures of zirconium oxide with iron oxide, cobalt oxide, and/or nickel oxide.

In aspects where the independently selected oxide includes one or more alkali metal oxides and one or more transition metal oxides, suitable alkali metal oxides can include, consist essentially of, or be magnesium oxide, calcium oxide, strontium oxide, and/or barium oxide, while suitable transition metals can include, consist essentially of, or be transition metals that can form oxides with the metal in a +2 or +3 oxidation state, such as yttrium oxide, iron oxide, zinc oxide, nickel oxide, vanadium oxide, cobalt oxide, zirconium oxide, lanthanum oxide, and/or other lanthanide oxides. Each of these alkali metal oxides and transition metal oxides can be independently selected individually or in any combination of multiple transition metal oxides. Examples of mixtures can include, consist essentially of, or be a mixture of oxides where at least one oxide is lanthanum oxide, zirconium oxide, and/or magnesium oxide; a mixture of oxides where the mixture includes at least two of lanthanum oxide, zirconium oxide, and magnesium oxide; a mixture of oxides where one oxide is magnesium oxide and/or calcium oxide; and/or a mixture of oxides where at least one oxide is lanthanum oxide, yttrium oxide, and/or zirconium oxide.

In some alternative aspects, a mixed metal oxide can include an alkaline earth carbonate in combination with a transition metal oxide. In such aspects, the alkaline earth carbonate can include, consist essentially of, or be magnesium carbonate and/or calcium carbonate. Additionally or alternately, the alkaline earth carbonate can be present in a mixture with an alkali metal carbonate. Examples of such carbonate mixtures can include, consist essentially of, or be mixtures of lithium carbonate with magnesium carbonate, lithium carbonate with calcium carbonate, potassium carbonate with magnesium carbonate, potassium carbonate with calcium carbonate, sodium carbonate with magnesium carbonate, and sodium carbonate with calcium carbonate (e.g., lithium carbonate with magnesium carbonate or potassium carbonate with magnesium carbonate). In such aspects, suitable transition metals can include, consist essentially of, or be transition metals that can form oxides with the metal in a +2 or +3 oxidation state, such as yttrium oxide, iron oxide, zinc oxide, nickel oxide, vanadium oxide, cobalt oxide, zirconium oxide, lanthanum oxide, other lanthanide oxides, and/or a combination thereof. Each of these alkaline earth carbonates and transition metal oxides can be independently selected individually or in any combination of multiple alkaline earth carbonates and/or multiple transition metal oxides. For the transition metal oxide, one preferred option can include a transition metal oxide selected from lanthanum oxide or zirconium oxide. Another option can include a metal oxide selected from lanthanum oxide, yttrium oxide, zirconium oxide, and/or zinc oxide. Yet another option can include a metal oxide selected from nickel oxide, cobalt oxide, and/or iron oxide. Mixtures within each of these options and/or across options are also contemplated, such as mixtures of oxides where at least one oxide is lanthanum oxide and/or zirconium oxide; mixtures of lanthanum oxide with zinc oxide and/or vanadium oxide; mixtures of lanthanum oxide with iron oxide, cobalt oxide, and/or nickel oxide; mixtures of zirconium oxide with yttrium oxide, zinc oxide, and/or vanadium oxide; and/or mixtures of zirconium oxide with iron oxide, cobalt oxide, and/or nickel oxide.

Additional or alternative materials can include hydrotalcites. In using such materials at high temperatures, it has been found that the WGS reaction and $CO_2$ adsorption can occur nearly simultaneously, which is highly beneficial for SEWGS processes.

In other embodiment, an adsorption module may contain multiple adsorbents selective for different compositions. For example, in one embodiment the adsorption module contains a first adsorbent selective for nitrogen, such as 4A or NaA zeolites, and the a second adsorbent selective for carbon dioxide, such as activated carbons, aluminas, metal organic framework, mixed metal oxides, hydrotalcites or combinations thereof.

The adsorbent coating can be in the form of individual particles (such as zeolite crystals) bound together to form a coating, a mixed matrix film containing the adsorbent particles, a porous layer having a sorbent (absorbent or adsorbent) in the pore structure, or a reasonably contiguous film of adsorbent material, as well as a combination of these structures. Non-limiting examples of mixed matrix films can include, but are not limited to, polymer films such as silicone rubber, polyimide films containing particles of zeolites such as DDR, CHA, MFI, Beta, FAU, and/or combinations or intergrowths thereof, and the like. Mixed matrix films on the exterior of the core can additionally or alternately contain pore/void structures. Examples of void structures can include voids between the polymer adsorbent particles, while pore structures can typically comprise interconnected pore networks. Examples of reasonably contiguous films of adsorbent materials can include crystalline adsorbent materials that are intergrown to form a film of adsorbent crystals, films of amorphous adsorbent materials, and the like. Intergrown films of adsorbent crystals can include zeolite films of DDR, MFI, and/or CHA grown on the exterior surface of the core. These films can additionally or alternately contain voids/pore networks. Examples of a porous layer having an adsorbent in the pore structure can include porous alumina with an ionic liquid imbibed into the pore structure. Examples of a porous layer having an adsorbent in the pore structure can include porous alumina with small zeolite particles packed/bound into the pore structure.

Examples of suitable coating methods can include fluid phase coating techniques, such as slurry coating, slip coating, hydrothermal film formation, hydrothermal coating conversion, and hydrothermal growth. When non-hydrothermal coating techniques are used, the coating solutions can typically include the adsorbent and a viscosifying agent, such as polyvinyl alcohol, and optionally a heat transfer solid and a binder. The heat transfer solid may not be needed in situations where the core of the particle can act as its own heat sink, e.g., by storing and releasing heat in the different steps of the separation process cycle. If a viscosifying agent, such as polyvinyl alcohol, is used, it can usually burn away when the coating is cured, e.g., in a kiln. Binders such as colloidal silica and/or alumina may be used to increase the mechanical strength of the fired coating. If the adsorbent includes a microporous, mesoporous, and/or macroporous component, this can typically occupy from about 20 to about 60% (e.g., from about 20% to about 40%) of the volume of the cured coating. To reduce the void volume of coatings containing such components, a blocking agent can be applied in a separate coating process. When hydrothermal film formation methods are chosen to apply the adsorbent layer, the coating techniques used can be very similar to the way in which zeolite membranes are prepared. An example of a method for growing a zeolite layer is described in U.S. Pat. No. 7,049,259, to which specific reference is made herein for incorporation of a description of such a method. Zeolite layers grown by hydrothermal synthesis on supports can often have cracks and grain boundaries that are mesoporous and/or macroporous in size. The volume of these pores can often be less than about 10 vol % of the film thickness, and there can often be a characteristic distance, or gap, between cracks. Thus, as-grown films can often be used directly as an adsorbent layer without the need for a blocking agent.

When the adsorbent coating is in the form of individual bound particles, the particles of the adsorbent material may be coated onto the core particles from a liquid e.g., a suspension or solution, and/or can be adhered to the particles, e.g., by physical attraction. One method for preparing a coating of individual bound particles can be to wash coat the particles onto the core. The wash coat can include binder particles that do not act as adsorbents.

When the adsorbent coating is a mixed matrix film containing adsorbent particles, it can be deposited on the cores from a slurry containing a solvent, polymer, and zeolite(s) can be coated onto the surface of the core in a variety of fluid bed, and spray drying and extrusion processes. In these processes the solvent can advantageously evaporate, leaving the mixed matrix polymer and zeolite film.

If the structured adsorbent is a porous layer having an adsorbent in the pore structure, a porous inorganic oxide film can be formed on the surface of the core, and an adsorbent liquid can be imbibed into the pore structure and/or adsorbent particles can be packed/coated into the pore structure. In imbibing situations, it can be preferred for the oxide film to be chosen so that the liquid film readily invades (i.e., wets the inside of) the pore structure. It can additionally or alternately be preferred that that the size of the pore structure can be selected to hold the liquid in place by capillary action. In coating/packing situations, coating techniques such as dry powered coating, slurry casting, and/or wash coating can be used to place adsorbent particles in the pore structure.

When the adsorbent is an intergrown film of adsorbent crystals, the coating can be produced by hydrothermal and/or solvothermal synthesis. For example, films of intergrown DDR (as well as MFI) crystals can readily be produced by hydrothermal synthesis. When the adsorbent is a film of an amorphous adsorbent material, it may be solution coated onto the core and/or formed on the core by a chemical reaction.

The core material may be porous or non-porous, as long as the low permeability requirement is met for rapid cycle operation. Non-porous solid materials can be preferred for certain kinetically-controlled processes, since the diffusion path in such processes can be more limited, although at the expense of a reduced surface area so that, although the faster cycles correlated with shorter diffusion paths can be achieved, the total sorption capacity may be reduced. If a low permeability porous solid is used, it may be a conventional porous support, such as a metal(loid) oxide or mixed oxide such as alumina, silica, and silica-alumina, or a zeolite, as well as a silica having pore structure in the microporous size range. Because of the desirability of keeping the permeability relatively low, mesoporous and macroporous materials are not likely to be preferred, though they may be used to form the adsorbent layer on the core. Silica gels can be a preferred source of porous cores, since they may be obtained commercially with a range of pore sizes and permeabilities and can be suitable for forming into particles by conventional extrusion techniques.

Non-porous particle cores may be made of any suitable material, such as metal, glass, ceramic, plastic, or the like, and may be mass manufactured by extrusion, molding, or an appropriate process based on the material. Cores can be hollow shells/spheres such as microballoons (microspheres) of glass/ceramics. Cores can additionally or alternately be porous particles whose centermost portion can contains a filler such as a polymer. An additional benefit of the core structure can occur when the core material can be selected to enhance the strength of the particles. Thus, should the coating form cracks due to thermal or other stresses, the overall particle structure could be maintained. Additionally, mechanical or thermal cracks that may occur in the adsorbent layers of the embodiments herein can advantageously be limited to within each individual particle alone, in contrast to cracks or failures of adsorbent layers in monoliths that can result in significant bypassing/failure of large sections of the monolithic adsorbent layers.

Since a major function of the core can be to act as a heat sink, the thermal conductivity and thermal capacity of the core material should generally be selected in accordance with the size of the particles. Particles at the larger end of the size range can preferably have a relatively higher thermal conductivity than smaller particles, since the thermal diffusion path in the smaller particles can be limited and/or the heat transfer into and out of the particle during the cycle may not result in an accumulation of heat within the particle, even with relatively short cycle times. A related consideration here is that the size of the particles can affect the void volume; although the void ratio is not necessarily affected by changing particle size, typically mostly/only by particle geometry, the larger gas passages between the particles resulting from larger particle size may not be as favorable to fast cycle operation, since gas/particle contact can be decreased as inter-particle volume increases with the cube of linear dimension, while surface area of the particles increases only with its square. Thus, a balance can advantageously be achieved between the thermodynamics of the selected adsorption process, the desired cycle time, and the particle dimensions.

In one embodiment, the sorbent material can be a basic, non-protogenic nitrogenous compound. Compounds of this type typically do not, as described above, enter into chemisorption reactions with $CO_2$ in the absence of water, although they do typically undergo reaction with $H_2S$. This differential chemical reactivity can be used to selectively separate between the sorbed $H_2S$ and $CO_2$. The sorbent may be used in liquid form but can generally be used on a porous solid support.

A wide variety of basic nitrogen-containing compounds may be used as the essential sorbent. If desired, a combination of such compounds may be used. The requirement for the desired selectivity for $H_2S$ adsorption is that the nitrogenous groups be non-protogenic (i.e., incapable of acting as a proton donor). Such nitrogenous groups therefore cannot contain an acidic, dissociable hydrogen atom (such as a primary or secondary amine), which is a prerequisite for the formation of carbamates as a route for the $CO_2$ chemisorption reaction in the absence of water. It is not generally required that the whole compound be aprotic (though it may), but only that the nitrogen-containing groups in the compound be non-protogenic. Non-protogenic nitrogen species are also typically non-nucleophilic under prevailing reaction conditions. Suitable nitrogenous compounds can include, but are not necessarily limited to, tertiary amines such as triethylamine, triethanolamine (TEA), methyldiethanolamine (MDEA), N,N,N',N'-tetrakis(2-hydroxyethyl)ethylenediamine, as well as non-protogenic nitrogenous bases with cyclic, multicyclic, and acyclic structures, such as imines, heterocyclic imines and amines, amidines (carboxamidines) such as dimethylamidine, guanidines, triazabicyclodecenes, imidazolines, and pyrimidines. Other compounds that can additionally or alternately be used can include the N,N-di(lower alkyl)carboxamidines (where lower alkyl is preferably $C_1$-$C_6$ alkyl), N-methyltetrahydropyrimidine (MTHP), 1,8-diazabicyclo[5.4.0]undece-7-ene (DBU), 1,5,7-triazabicyclo[4.4.0]dec-5-ene (TBD), 7-methyl-1,5,7-triazabicyclo[4.4.0]dec-5-ene (MTBD), 1,5-diazabicyclo[4.3.0]non-5-ene (DBN), substituted guanidines of the formula $(R^1R^2N)(R^3R^4N)C=N-R^5$ (where $R^2$, $R^3$ and $R^4$ are preferably lower alkyl ($C_1$-$C_6$) and $R^5$ is preferably H or lower alkyl ($C_1$-$C_6$)) such as 1,1,3,3-tetramethylguanidine and biguanide, as well as combinations thereof. Other substituent groups on these compounds such as higher alkyl, cycloalkyl, aryl, alkenyl, and substituted alkyl and other structures may also be used.

In some embodiments, the more highly basic non-protogenic nitrogenous compounds can be preferred, since they are capable of maintaining basic conditions favoring $H_2S$ sorption. For this reason, the bases having a $pK_a$ (acid dissociation constant, as measured or predicted at 25° C. in aqueous solution or as measured in another solvent and converted to an aqueous value) of at least 9.0 can be preferred, though higher values of at least 10.0, at least 12.0, or at least 13.0 can be desirable for improved/optimal chemisorption of $H_2S$. A useful means of making an adequate prediction of the $pK_a$ value of the base may be provided by the ACD/PhysChem Suite (a suite of software tools for the prediction of basic physicochemical properties including $pK_a$), available from Advanced Chemistry Development, Inc., 110 Yonge Street, Toronto, Ontario, Canada M5C 1T4. Exemplary $pK_a$ values for a limited number compounds (in dimethylsulfoxide) may be found in the Bordwell online $pK_a$ database, http://www.chem.wisc.edu/areas/reich/pkatable/index.htm).

Though the process may be operated with the basic sorbent in the liquid phase, more typically when basic sorbent is used it can be supported on a porous, solid support. To operate using a solid phase sorbent, the basic nitrogenous compound, if liquid (as most are), can be supported on a porous, solid support or carrier material, preferably of relatively high surface area. If the basic compound is a solid, it may be dissolved to form a solution which can then be used to impregnate the support material. Supports of this kind are frequently used as the catalysts in catalytic processes such as hydrogenation, hydrotreating, hydrodewaxing, etc. Common support materials can include carbon (activated charcoal) and/or porous solid oxides of metals and metalloids and mixed oxides, including alumina, silica, silica-alumina, magnesia, and zeolites, as well as combinations thereof. Porous solid polymeric materials can additionally or alternately be suitable, provided that they are resistant to the environment in which the sorption reaction is conducted. As the components of the gas stream tend to have relatively small molecular dimensions, the minimum pore size of the support may not in itself be a severely limiting factor, but, when the basic nitrogenous compound is impregnated, the entrances to the pore systems of small and intermediate pore size zeolites (such as zeolite 4A, erionite, ZSM-5, ZSM-11, and the like) may become occluded by the (bulky) amine component; for this reason, the smaller pore materials may not be preferred, especially with the bases of relatively larger molecular dimensions. Large pore size zeolites with 12-membered ring systems (such as ZSM-4, faujasites such as zeolite X and the variants of zeolite Y including Y, REY, and USY, and the like) may, however, be suitable depending on the dimensions of the basic nitrogenous compound(s) utilized. Amorphous porous solids with a range of different pore sizes may be utilized in embodiments herein, since some of the pores will have openings large enough to accept the basic component and to also allow sufficient access to the components of the gas stream. Supports containing highly acidic reaction sites, as with the more highly active zeolites, can tend to be more susceptible to fouling reactions upon reaction with the nitrogenous compound and may therefore be generally less preferred in some embodiments than the less acidic supports.

A preferred class of solid oxide supports can include but is not limited to mesoporous and/or macroporous silica materials such as the silica compounds of the M41S series, including MCM-41 (hexagonal), MCM-48 (cubic), and other mesoporous materials such as SBA-1, SBA-2, SBA-3, and SBA-15, as well as the KIT series of mesoporous materials such as KIT-1, KIT-5, and KIT-6. Macroporous silicas and other oxide supports such as the commercial macroporous silicas available as Davisil® products may be suitable, e.g., Davisil 634® (~6 nm pore size, ~480 m$^2$/g pore volume), Davisil 635® (~6 nm, ~480 m$^2$/g), and/or Davisil 644® (~15 nm, ~300 m$^2$/g). According to the IUPAC definition, mesoporous materials are those having a pore size of about 2 nm to about 50 nm, and macroporous materials are those having a pore size of over ~50 nm. According to the IUPAC, a mesoporous material can be disordered or ordered in a mesostructure. Preferred mesoporous and macroporous support materials can be characterized by a BET surface area of at least 300 m$^2$/g, e.g., at least 500 m$^2$/g, prior to treatment with the base compound. The M41S materials and their synthesis are described in a number of Mobil patents, including U.S. Pat. Nos. 5,102,643, 5,057,296, 5,098,684, and 5,108,725, to which reference is made for a description of them, as well as in the literature in "*The Discovery of ExxonMobil's M41S Family of Mesoporous Molecular Sieves*", Kresge et al, Studies in Surface Science and Catalysis, 148, Ed. Terasaki, Elsevier bV 2004. SBA-15 is described in "*Triblock Copolymer Syntheses of Mesoporous Silica with Periodic 50 to 300 Angstrom Pores*", Dongyuan Zhao, et al. (1998), *Science* 279 (279). KIT-1 is described in U.S. Pat. No. 5,958,368, and other members of the KIT series are known (see, e.g., KIT-6 in *Nanoscale Res Lett.*, 2009 November, 4(11): 1303-1308).

As shown below, the $H_2S/CO_2$ selectivity of the material can be adjusted by the judicious choice of the porous support structure; coupled with the potential for controlling the $H_2S/CO_2$ selectivity by the use of different adsorbent molecules on the support, there is a significant potential for tailoring the selectivity of the adsorbent.

The basic nitrogenous compound may simply be physically sorbed on the support material (e.g., by impregnation or bonded with or grafted onto it by chemical reaction with the base itself or a precursor or derivative in which a substituent group provides the site for reaction with the support material in order to anchor the sorbent species onto the support). Typically, however, bonding is not required for an effective solid phase sorbent material. Support materials containing reactive surface groups (such as the silanol groups found on zeolites and the M41S silica oxides) are typically capable of reacting with siloxane groups in compounds such as trimethoxysilylpropyl-dimethylamine. An alternative method of fixing more volatile adsorbing species on the support can be by first impregnating the species into the pores of the support and then cross-linking them in place through a reaction that does not involve the basic nitrogenous groups responsible for the sorption reaction in order to render the sorbing species non-volatile under the selected sorption conditions. Grafting or bonding methods are known in the technical literature. The molecular dimensions of the base sorbent can advantageously be selected in accordance with the pore dimensions of the support material, since bulky bases/precursors/derivatives may not be capable of entering pores of limited dimensions. A suitable match of base and support may be determined if necessary by empirical means.

Solid phase sorbents will normally be operated in fixed beds contained in a suitable vessel and operated in the conventional cyclic manner with two or more beds in a unit with each bed switched between sorption and desorption and, optionally, purging prior to re-entry into the sorption portion of the cycle. Purging may be carried out with a stream of the purified gas mixture, i.e., a stream of the gas from which the $H_2S$ has been removed in the sorption process. If operated in temperature swing mode, a cooling step will intervene at some point between the desorption step and the next absorption step. Alternatively, moving bed or fluidized bed systems any be used; rotating wheel beds are notably useful in rapid cycle sorption systems. All these systems may be operated in their conventional manner when using the present sorbents.

Process Configuration

Figure 1A:
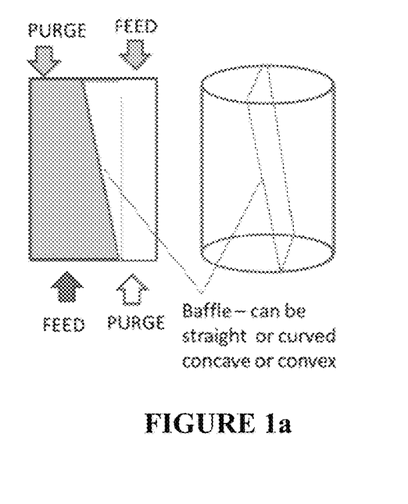
FIG. 1a shows a cylindrical module with two tapered beds created by an intermediate angled baffle with feed and purge flow in opposite directions between the two beds.
Figure 1B:
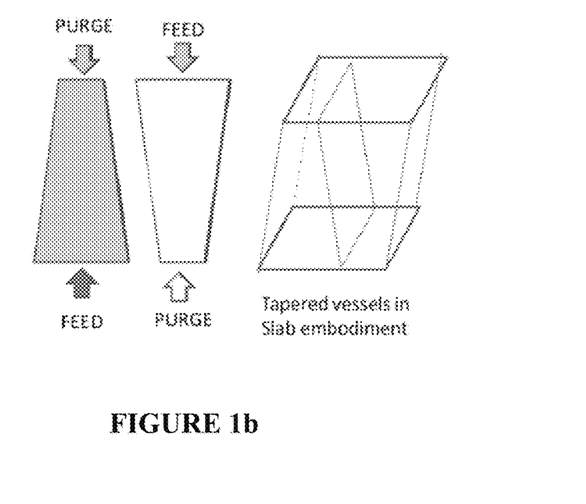
FIG. 1b shows a prismatic module with two tapered beds created by an intermediate angled baffle with feed and purge flow in opposite directions between the two beds.

Though a highly simplified version of a natural gas purification unit operating in the pressure swing adsorption mode is used as an example herein, it should be understood that the swing adsorption unit can operate equally for any reasonable gas separation using an adsorbent material. An incoming feedstream can enter the purification unit, as shown in the various views of FIGS. 1a and 1b, and passed through the feed end of the adsorbent bed. As shown, the angled baffle creates two tapered adsorbent beds with feed flow in each bed opposite to the other. The feedstream enters a respective bed at the point where it has the largest cross-sectional area and exits at the point where it has the smallest cross-sectional area. The baffle separating the bed can be straight or curved, concave or convex. In addition, to creating an advantageous taper, such an angled baffle adsorption column offers the advantage of compactness while enabling the heat transfer between adsorbents via the baffle. The purification vessel wall or baffle may be textured to improve fluid and heat flow characteristics. Such texturing can include the use of vanes affixed to the vessel or baffle. The swing adsorption unit may have rotary or non-rotary valves at the feed and product ends. According to a controlled cycle, other adsorption beds can be in another stage of swing adsorption besides adsorption, such as desorption, purge, regeneration, or the like. The sorption vessels can contain fixed beds of a solid adsorbent material at least a portion of which is selective for the at least one contaminant gas, as described below. The sorption bed can additionally or alternately contain materials that have selectivity for other species. In one embodiment, the bed can be segmented with an initial portion containing an $H_2S$-selective sorbent and the final portion containing a $CO_2$-selective adsorbent. After passing through a bed of adsorbent material in the bed on the adsorption phase of the cycle, the purified gas can exit the bed through the product end in the form of a product effluent in which the at least one desired product gas, has a notably higher concentration than in the feedstream. In certain embodiments, the product(s) stream(s) can exit the vessel at substantially the same pressure as the feedstream pressure. It should be noted that in $H_2$ production combined with CCS operations, high purity $H_2$ can be considered the desired product gas, but high purity $CO_2$ can also be considered a second desired product gas, rather than a contaminant despite the fact that in those applications, the $CO_2$ will be preferentially adsorbed onto the adsorbent. In PSA operations, the bed can advantageously be depressurized before purging, and/or in TSA operations, the bed can advantageously be heated before purging. Contaminant effluent containing the desorbed contaminant (or second product) can be exhausted from the vessels and the concentrated contaminants recovered and processed, reused, or the like.

Figure 2:
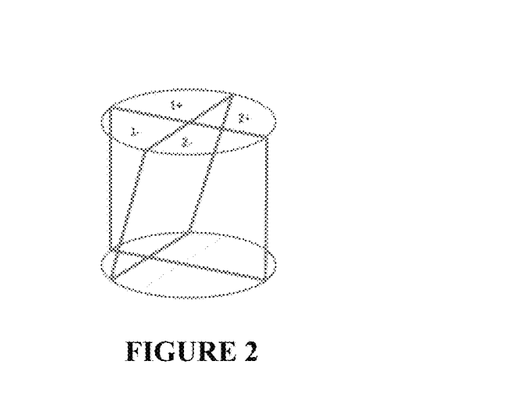
FIG. 2 shows an adsorption module with four tapered beds created by two intermediate angled baffles.

Additional embodiments are shown where a plurality of baffles can be used to segment or divide a vessel into arrangements that produce enhancements to the taper ratio, defined as the relative area of feed cross-section to product cross-section. FIG. 2 shows an exemplary compact adsorbent bed that may be used in this invention, which permits heat transfer between four tapered adsorbent columns. FIG. 2 depicts a configuration of the adsorbent columns where they are placed in a vessel have two angled baffles. The adsorbent columns are placed coaxially in quadruples. The compactness of the adsorbent bed in FIG. 2 additionally allows efficient pressure equalizations between different adsorbent columns (e.g. 1+. 2−) as the columns are situated in close proximity to one another other and thus do not require the use of expensive piping. For the same reason, the effluent of one column can be efficiently discharged to another. The partition separating the adsorbent columns in FIG. 2 may be made of a thermal conducting material such that heat transfer is permitted between adjacent columns.

Figure 3A:
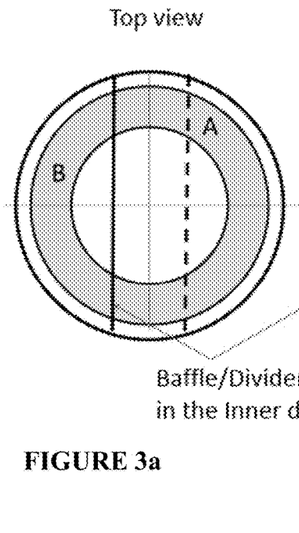
FIG. 3a shows the top view of a cylindrical module with two tapered beds created by an intermediate angled baffle with feed flow in opposite directions between the two beds.
Figure 3B:
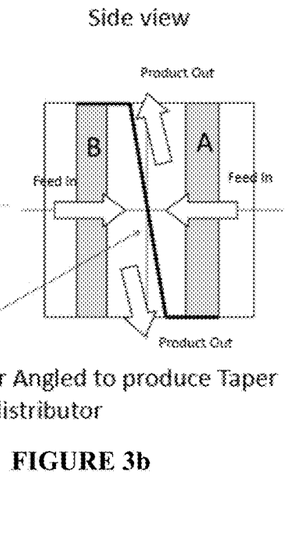
FIG. 3b shows a side view and depicts the feed and product flow through the two beds.
Figure 4A:
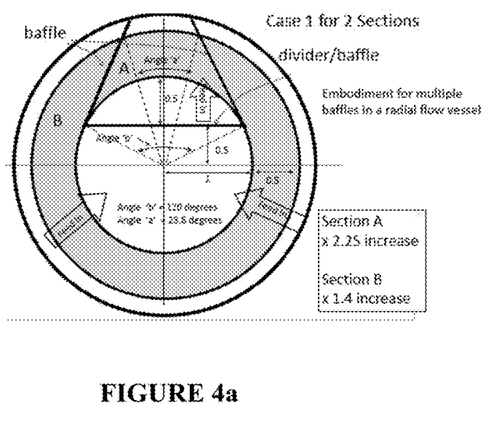
FIG. 4a shows the top view a cylindrical module utilizing multiple baffles to create two tapered adsorbent beds.
Figure 4B:
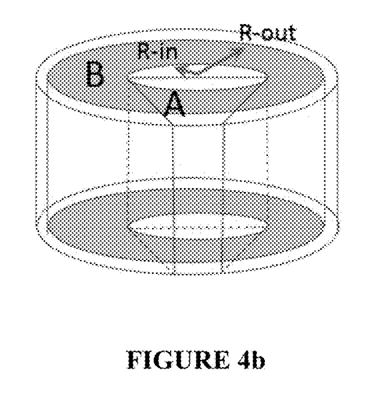
Figure 5A:
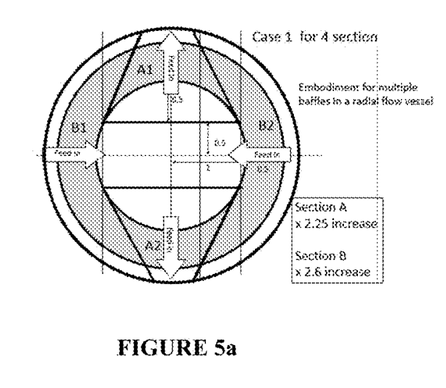
FIG. 5a shows the top view a cylindrical module utilizing multiple baffles to create four tapered adsorbent beds.
Figure 5B:
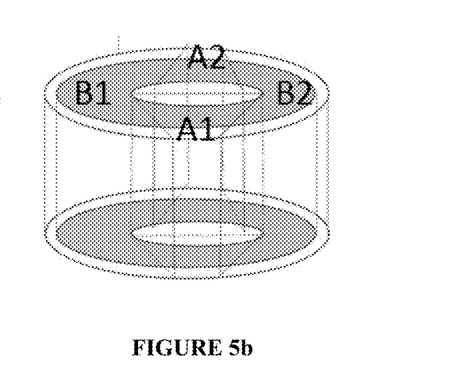
Figure 6:
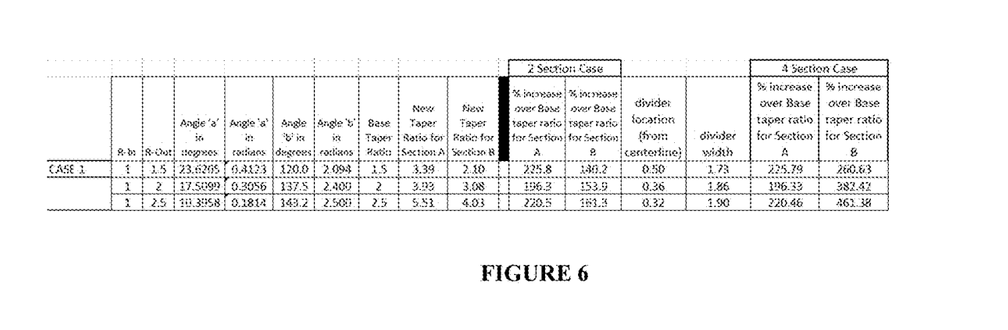
FIG. 6 depicts the cross-section area increase provided by the tapered adsorbent beds depicted in FIGS. 4 and 5.

In other embodiments, the angled baffle can be placed in a radial flow configuration as shown in FIGS. 3a and 3b. Additionally or alternatively, multiple baffles placed at angles segment a radial flow configuration vessel into two sections A and B, as shown in FIGS. 4a and 4b where feed flow is organized in Section B to occur from Out-to-In, whereas in section A feed flow occurs from In-to-Out. Product flow can occur from each section from the opposite direction (i.e. top for Section A and bottom for Section B). In yet another embodiment, multiple such baffles (A1, A2, B1, B2, etc.) are used to segment such radial flow vessels into four adsorbent bed regions as depicted in FIGS. 5a and 5b. FIG. 6 provides a table evidencing that the taper ratio is enhanced over the base taper ratio (R-Out/R-In) offered by radial flow systems. The baffles in the figures are shown as planar but can be curved, convex or concave or both, include heat transfer features, possess surface texturing, and, in radial flow systems, add strength to hanging baskets/mesh that form the cages which hold the annular adsorbents.

In operation in the PSA mode, the incoming gas can be passed over the selected bed of sorption material for a fixed time controlled by a cycle controller and/or until contaminant breakthrough is indicated by a stream controller in the vessel. At this point, the valves can be actuated to stop the flow of gas into and out of the vessel which has been in the sorption phase and to re-direct it to another vessel containing freshly purged material. The valves can then be controlled to allow a reduction of pressure in the vessel used for sorption so that the sorbed contaminant(s) can be selectively released from the adsorbent material into the exhaust line. Desorption may be assisted, preferably towards/at the end of the pressure reduction phase, e.g., by purging with a gas stream comprised of recycle product and/or inert gas such as $N_2$ and/or steam. The purge stream may be heated if necessary to facilitate stripping of the adsorbed contaminant(s).

Since the selectivity of the process is typically favored by operation with a non-aqueous sorbent, it can be preferable to maintain the water content of the system at a relatively low level. This, however, is not inconsistent with water in the incoming gas stream at relatively low level, for example, less than 5 mol %, less than 2 mol %, or less than 0.1 mol % (less than 1000 ppm), based on the molar composition of the overall incoming gas feedstream. If, however, water from the gas feedstream tends to accumulate in the sorbent, it may be desirable to remove a slip stream of adsorbent for removal of the water, e.g., by gas stripping, passing over a dryer, heating, and/or by evaporation under reduced pressure. Embodiments herein can additionally or alternately include drying the incoming feed gas to the system to remove a portion of water therefrom by means of dryers, precipitators, condensers, demisters, coalescers, and/or desiccants prior to subjecting the feed gas to the adsorbent systems described herein.

The process may be operated according to conventional operating procedures appropriate to the process variant in use. It may be operated as a conventional PSA (cPSA) or TSA process, purge desorption (purge with inert gas such as nitrogen, which is not adsorbed), displacement purge (displacement with a competitively adsorbed species), or as a combination of these process variants. It may be operated as one of the rapid cycle variants (cycle time for a complete sorption/desorption cycle less than about two minutes, e.g., less than about one minute), including partial pressure swing or displacement purge adsorption (PPSA), rapid cycle pressure swing adsorption (RCPSA), Dual Bed (or Duplex) PSA Process, Dual Reflux PSA Process, complementary PSA process, rapid cycle partial pressure swing, displacement purge adsorption (RCPPSA) technologies, or rapid cycle thermal swing adsorption (RCTSA) with rapid cycle variants using a solid phase sorbent system. Selection of conditions can frequently be dictated by the conditions (e.g., pressure and flow rate of the entering gas stream, proportion and type of contaminants, and desired pressure for the effluent product stream), with the most appropriate conditions selected on an empirical basis.

Adsorptive kinetic separation processes, apparatuses, and systems, as described above, are useful for development and production of hydrocarbons, such as gas and oil processing. Particularly, the provided processes, apparatuses, and systems can be useful for the rapid, large scale, efficient separation of a variety of target gases from gas mixtures.

The provided processes, apparatuses and systems may be used to produce purified hydrogen and carbon dioxide from syngas produced by a variety of refinery processes. The purified hydrogen can be used in hydroprocessing applications and the purified carbon dioxide can be directed to the refinery's CCS system. Exemplary purities for hydrogen exceed 99%, e.g. 99.9% or 99.99% purity.

The provided processes, apparatuses, and systems may also be used to prepare natural gas products by removing contaminants and heavy hydrocarbons (having at least two carbon atoms). The provided processes, apparatuses, and systems can be useful for preparing gaseous feed streams for use in utilities, including separation applications such as dew point control, sweetening/detoxification, corrosion protection/control, dehydration, heating value, conditioning, and purification. Examples of utilities that utilize one or more separation applications can include generation of fuel gas, seal gas, non-potable water, blanket gas, instrument and control gas, refrigerant, inert gas, and hydrocarbon recovery. Exemplary "not to exceed" product (or "target") acid gas removal specifications can include: (a) 2 vol % $CO_2$, 4 ppm $H_2S$; (b) 50 ppm $CO_2$, 4 ppm $H_2S$; or (c) 1.5 vol % $CO_2$, 2 ppm $H_2S$.

The provided processes, apparatuses, and systems may be used to remove acid gas from hydrocarbon streams. Acid gas removal technology becomes increasingly important as remaining gas reserves exhibit higher concentrations of acid (sour) gas resources. Hydrocarbon feed streams can vary widely in amount of acid gas, such as from several parts per million to 90 vol %. Non-limiting examples of acid gas concentrations from exemplary gas reserves can include concentrations of at least: (a) 1 vol % $H_2S$, 5 vol % $CO_2$; (b) 1 vol % $H_2S$, 15 vol % $CO_2$; (c) 1 vol % $H_2S$, 60 vol % $CO_2$; (d) 15 vol % $H_2S$, 15 vol % $CO_2$; or (e) 15 vol % $H_2S$, 30 vol % $CO_2$.

Compared to conventional technology, the provided processes, apparatuses, and systems can require lower capital investment, lower operating cost, and/or less physical space, thereby enabling implementation offshore and in remote locations, such as arctic environments. The provided processes, apparatuses, and systems can provide the foregoing benefits, while providing high product (e.g., hydrocarbon) recovery as compared to conventional technology.

Additionally or alternately, the invention can comprise one or more of the following embodiments.

Embodiment 1

An adsorption module comprising: a vessel containing an adsorbent; a baffle within the vessel, the baffle angled to create two separated, tapered adsorbent beds within the vessel; the adsorbent beds each comprising a feed end cross-sectional area and a product end cross-sectional area, wherein the feed end cross-sectional area is greater than the product end cross-sectional area.

Embodiment 2

The adsorption module of embodiment 1, wherein the vessel is tubular.

Embodiment 3

The adsorption module of any of the previous embodiments, wherein the vessel is prismatic.

Embodiment 4

The adsorption module of any of the previous embodiments, wherein the baffle is angled between 10 and 60° from the vertical plane, inclusive.

Embodiment 5

The adsorption module of any of the previous embodiments, wherein a ratio of the feed end cross-sectional area to the product end cross-sectional area is from 1.2 to 10, inclusive.

Embodiment 6

The adsorption module of any of the previous embodiments, further comprising rotary valves both on the feed end and on the product end of the adsorbent beds.

Embodiment 7

The adsorption module of any of the previous embodiments, further comprising non-rotary valves both on the feed end and on the product end of the adsorbent beds.

Embodiment 8

The adsorption module of any of the previous embodiments, wherein the adsorbent comprises one of an (i) alkali metal carbonate and an oxide of an alkaline earth metal or a transition metal and (ii) alkaline earth metal carbonate and an oxide of a transition metal.

Embodiment 9

The adsorption module of any of the previous embodiments, wherein the alkali metal carbonate is potassium carbonate, lithium carbonate, or sodium carbonate.

Embodiment 10

The adsorption module of any of the previous embodiments, wherein the adsorbent comprises a transition metal oxide of a transition metal that forms an oxide with the metal in a +2 or +3 oxidation state.

Embodiment 11

The adsorption module of any of the previous embodiments, wherein the adsorbent comprises at least one of lithium carbonate and potassium carbonate and at least one of lanthanum oxide, yttrium oxide, and magnesium oxide.

Embodiment 12

The adsorption module of any of the previous embodiments, wherein the alkaline earth metal carbonate is magnesium carbonate or calcium carbonate.

Embodiment 13

The adsorption module of any of the previous embodiments, wherein the adsorbent comprises at least one of magnesium carbonate and calcium carbonate and at least one of lanthanum oxide, yttrium oxide, and magnesium oxide.

Embodiment 14

The adsorption module of any of the previous embodiments, further comprising an additional baffle, the additional baffle angled and intersecting the first baffle to create four separated, tapered adsorbent beds within the vessel; the adsorbent beds each comprising a feed end cross-sectional area and a product end cross-sectional area, wherein the feed end cross-sectional area is greater than the product end cross-sectional area.

Embodiment 15

The adsorption vessel of any of the previous embodiments, wherein the baffle is textured.

Embodiment 16

An adsorption process comprising: providing a feedstream containing a first concentration of a first product gas and a first concentration of a second product gas; contacting the feedstream with an adsorption module comprising a vessel, the vessel including an angled baffle within the vessel to create two separated, tapered adsorbent beds within the vessel; the adsorption beds each comprising a feed end cross-sectional area and a product end cross-sectional area, wherein the feed end cross-sectional area is greater than the product end cross-sectional area; the adsorption beds comprising an adsorption material under conditions sufficient for the adsorption material to selectively adsorb the second product gas in comparison to the second product gas, so as to form a gas effluent having a second concentration of the first product gas that is higher than the first concentration in the feedstream and having a second concentration of the second product gas that is lower than the first concentration in the feedstream; and selectively desorbing the second product gas from the adsorption material, so as to form a product effluent having a third concentration of the second product gas that is at least 20 wt % higher than the first concentration in the feedstream and having a second concentration of the first product gas that is at least 20 wt % lower than the first concentration in the feedstream.

Embodiment 17

The process of embodiment 16, wherein the vessel is tubular.

Embodiment 18

The process of any of embodiments 16-17, wherein the vessel is prismatic.

Embodiment 19

The process of any of embodiments 16-18, wherein the baffle is angled between 10 and 60° from the vertical plane, inclusive.

Embodiment 20

The process of any of embodiments 16-19, wherein a ratio of the feed end cross-sectional area to the product end cross-sectional area is from 1.2 to 10, inclusive.

Embodiment 21

The process of any of embodiments 16-20, wherein the adsorption module further comprises rotary valves both on the feed end and on the product end of the adsorbent beds.

Embodiment 22

The process of any of embodiments 16-21, wherein the adsorption module further comprising non-rotary valves both on the feed end and on the product end of the adsorbent beds.

Embodiment 23

The process of any of embodiments 16-22, wherein the feedstream comprises syngas, the first product gas comprises hydrogen, and the second product gas comprises $CO_2$.

Embodiment 24

The process of any of embodiments 16-23, wherein the adsorption process is a pressure swing adsorption process.

Embodiment 25

The process of any of embodiments 16-24, wherein the conditions sufficient include an adsorption temperature of at least 400° C., wherein the adsorbent material comprises an one of an (i) alkali metal carbonate and an oxide of an alkaline earth metal or a transition metal and (ii) alkaline earth metal carbonate and an oxide of a transition metal.

Embodiment 26

The process of embodiment 25, wherein the alkali metal carbonate is potassium carbonate, lithium carbonate, or sodium carbonate.

Embodiment 27

The process of any of embodiments 16-24, wherein the adsorbent comprises a transition metal oxide of a transition metal that forms an oxide with the metal in a +2 or +3 oxidation state.

Embodiment 28

The process of embodiment 25, wherein the adsorbent comprises at least one of lithium carbonate and potassium carbonate and at least one of lanthanum oxide, yttrium oxide, and magnesium oxide.

Embodiment 29

The process of embodiment 25, wherein the alkaline earth metal carbonate is magnesium carbonate or calcium carbonate.

Embodiment 30

The process of embodiment 25, wherein the adsorbent comprises at least one of magnesium carbonate and calcium carbonate and at least one of lanthanum oxide, yttrium oxide, and magnesium oxide.

Embodiment 31

The process of any of embodiments 16-30, wherein the first product gas purity is at least 99.99%.

Embodiment 32

The process of any of embodiments 16-31, wherein the first product gas is nitrogen and the second product gas is $CO_2$.

Embodiment 33

The process of any of embodiments 16-32, wherein the adsorption module comprises a first adsorbent selective for nitrogen and a second adsorbent selective for $CO_2$.

Embodiment 34

The process of embodiment 33, wherein the first adsorbent is selected from the group consisting of 4A and NaA zeolites and the second adsorbent is selected from the group consisting of activated carbons, aluminas, metal organic framework, mixed metal oxides, hydrotalcites or combinations thereof.

Embodiment 35

The process of any of embodiments 16-34, further comprising injecting the produced nitrogen and $CO_2$ into a methane hydrate reservoir for methane recovery.

Embodiment 36

The process of embodiment 35, wherein the nitrogen and $CO_2$ are injected into the methane hydrate reservoir at a pressure of at least 25 bar.

Embodiment 37

The process of any of embodiments 16-36, wherein the pressure of the first and second product gases is the same as feedstream pressure.

The invention claimed is:

1. An adsorption module comprising:
    a vessel containing an adsorbent;
    a first angled baffle within the vessel; and
    a second baffle, the second baffle angled and intersecting the first baffle to create four separated, tapered adsorbent beds within the vessel; the adsorbent beds each comprising a feed end cross-sectional area and a product end cross-sectional area, wherein the feed end cross-sectional area is greater than the product end cross-sectional area.

2. The adsorption module of claim 1, wherein the vessel is tubular.

3. The adsorption module of claim 1, wherein the vessel is prismatic.

4. The adsorption module of claim 1, wherein the first baffle is angled between 10 and 60° from the vertical plane, inclusive.

5. The adsorption module of claim 1, wherein a ratio of the feed end cross-sectional area to the product end cross-sectional area is from 1.2 to 10, inclusive.

6. The adsorption module of claim 1, further comprising rotary valves both on the feed end and on the product end of the adsorbent beds.

7. The adsorption module of claim 1, further comprising non-rotary valves both on the feed end and on the product end of the adsorbent beds.

8. The adsorption module of claim 1, wherein the adsorbent comprises one of an (i) alkali metal carbonate and an oxide of an alkaline earth metal or a transition metal and (ii) alkaline earth metal carbonate and an oxide of a transition metal.

9. The adsorption module of claim 8, wherein the alkali metal carbonate is potassium carbonate, lithium carbonate, or sodium carbonate.

10. The adsorption module of claim 1, wherein the adsorbent comprises a transition metal oxide of a transition metal that forms an oxide with the metal in a +2 or +3 oxidation state.

11. The adsorption module of claim 1, wherein the adsorbent comprises at least one of lithium carbonate and potassium carbonate and at least one of lanthanum oxide, yttrium oxide, and magnesium oxide.

12. The adsorption module of claim 8, wherein the alkaline earth metal carbonate is magnesium carbonate or calcium carbonate.

13. The adsorption module of claim 1, wherein the adsorbent comprises at least one of magnesium carbonate and calcium carbonate and at least one of lanthanum oxide, yttrium oxide, and magnesium oxide.

14. The adsorption vessel of claim 1, wherein the first or the second baffle is textured.

15. An adsorption process comprising:
    providing a feedstream containing a first concentration of a first product gas and a first concentration of a second product gas;
    contacting the feedstream with an adsorption module comprising a vessel, the vessel including a first baffle within the vessel; the adsorption beds comprising an adsorption material under conditions sufficient for the adsorption material to selectively adsorb the second product gas in comparison to the second product gas, so as to form a gas effluent having a second concentration of the first product gas that is higher than the first concentration in the feedstream and having a second concentration of the second product gas that is lower than the first concentration in the feedstream; and
    selectively desorbing the second product gas from the adsorption material, so as to form a product effluent having a third concentration of the second product gas that is at least 20 wt % higher than the first concentration in the feedstream and having a third concentration of the first product gas that is at least 20 wt % lower than the first concentration in the feedstream;
    wherein the vessel further comprises a second baffle, the second baffle angled and intersecting the first baffle to create four separated, tapered adsorbent beds within the vessel.

16. The process of claim 15, wherein the vessel is tubular.

17. The process of claim 15, wherein the vessel is prismatic.

18. The process of claim 15, wherein the first baffle is angled between 10 and 60° from the vertical plane, inclusive.

19. The process of claim 15, wherein a ratio of the feed end cross-sectional area to the product end cross-sectional area is from 1.2 to 10, inclusive.

20. The process of claim 15, wherein the adsorption module further comprises rotary valves both on the feed end and on the product end of the adsorbent beds.

21. The process of claim 15, wherein the adsorption module further comprising non-rotary valves both on the feed end and on the product end of the adsorbent beds.

22. The process of claim 15, wherein the feedstream comprises syngas, the first product gas comprises hydrogen, and the second product gas comprises $CO_2$.

23. The process of claim 22, wherein the conditions sufficient include a pressure swing adsorption process.

24. The process of claim 23, wherein the conditions sufficient include an adsorption temperature of at least 400° C., wherein the adsorbent material comprises an one of an (i) alkali metal carbonate and an oxide of an alkaline earth metal or a transition metal and (ii) alkaline earth metal carbonate and an oxide of a transition metal.

25. The process of claim 24, wherein the alkali metal carbonate is potassium carbonate, lithium carbonate, or sodium carbonate.

26. The process of claim 23, wherein the adsorbent comprises a transition metal oxide of a transition metal that forms an oxide with the metal in a +2 or +3 oxidation state.

27. The process of claim 24, wherein the adsorbent comprises at least one of lithium carbonate and potassium carbonate and at least one of lanthanum oxide, yttrium oxide, and magnesium oxide.

28. The process of claim 24, wherein the alkaline earth metal carbonate is magnesium carbonate or calcium carbonate.

29. The process of claim 24, wherein the adsorbent comprises at least one of magnesium carbonate and calcium carbonate and at least one of lanthanum oxide, yttrium oxide, and magnesium oxide.

30. The process of claim 21, wherein the purity of the first product gas is at least 99.99%.

31. The process of claim 15, wherein the first product gas is nitrogen and the second product gas is $CO_2$.

32. The process of claim 31, wherein the adsorption module comprises a first adsorbent selective for nitrogen and a second adsorbent selective for $CO_2$.

33. The process of claim 32, wherein the first adsorbent is selected from the group consisting of 4A and NaA zeolites and the second adsorbent is selected from the group consisting of activated carbons, aluminas, metal organic framework, mixed metal oxides, hydrotalcites, and combinations thereof.

34. The process of claim 31, further comprising injecting the produced nitrogen and $CO_2$ into a methane hydrate reservoir for methane recovery.

35. The process of claim 34, wherein the nitrogen and $CO_2$ are injected into the methane hydrate reservoir at a pressure of at least 25 bar.

36. The process of claim 15, wherein the pressure of the first and second product gases is the same as feedstream pressure.

* * * * *